April 21, 1964    L. M. BIBERMAN ETAL    3,130,310
ULTRA-VIOLET AIRCRAFT PROXIMITY WARNING DEVICE
WITH SCANNING MIRROR AND ULTRA-VIOLET SOURCE
Filed Jan. 4, 1962    2 Sheets-Sheet 1

INVENTORS.
LUCIEN M. BIBERMAN
RICHARD G. MC CARTY
BY

*P. H. Firsht*
ATTORNEY.

INVENTORS.
LUCIEN M. BIBERMAN
RICHARD G. MC CARTY
BY

*P. H. Firsht*

ATTORNEY.

United States Patent Office 3,130,310
Patented Apr. 21, 1964

3,130,310
ULTRA-VIOLET AIRCRAFT PROXIMITY WARNING DEVICE WITH SCANNING MIRROR AND ULTRA-VIOLET SOURCE
Lucien M. Biberman, Chicago, Ill., and Richard G. McCarty, Santa Barbara, Calif., assignors to the United States of America as represented by the Secretary of the Navy
Filed Jan. 4, 1962, Ser. No. 164,427
12 Claims. (Cl. 250—83.3)
(Granted under Title 35, U.S. Code (1952), sec. 266)

The invention herein described may be manufactured and used by or for the Government of the United States of America for governmental purposes without the payment of any royalties thereon or therefor.

This invention relates to search devices; and more particularly to systems emitting and detecting ultra-violet or "black" radiation for early warning of approaching aircraft within moderate ranges; for example, ten miles.

Infrared and radar systems are commonly used as search devices and may be adapted to early warning systems. However, the infrared systems are subject to radiation from the sun and sky and earth backgrounds, while radar systems are costly, heavy and complex and require multiple radars or antennas to provide the necessary wide angle coverage.

The present invention avoids the disadvantages of the infrared and radar search systems by providing a warning and search system including means emitting ultra-violet or "black" radiation and interference-free solar-blind "black" radiation ultra-violet detection means for detecting radiation in the 2400–2850 angstroms band and warning of the presence of aircraft in the vicinity emitting ultra-violet radiation, which system is simple, lightweight, indicates the approximate bearing and range of the aircraft, provides all-around search, and is relatively inexpensive compared to the other search systems.

It is therefore an object of the present invention to provide an early warning and search device which is simple, lightweight and inexpensive.

Another object is the provision of a search device which is solar-blind and utilizes ultra-violet radiation in the "black" region.

A further object is to provide a search device which gives all-around search and indicates the approximate bearing and range of the proximate aircraft.

Other objects, features and many of the attendant advantages of this invention will become readily appreciated as the same become better understood by reference to the following detailed description when considered in connection with the accompanying drawings wherein.

Figure 1:
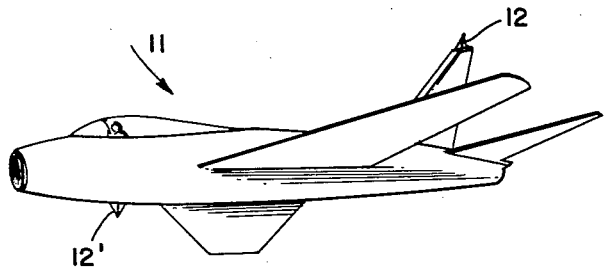
FIG. 1 is a perspective view of an aircraft equipped with a warning and search system in accordance with the present invention.
Figure 2:
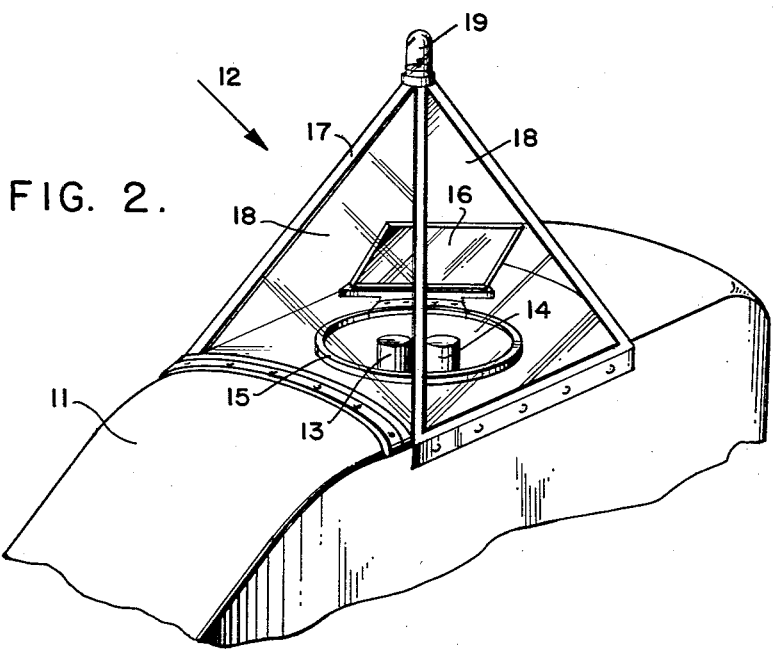
FIG. 2 is an enlarged perspective view of the upper warning and search device of FIG. 1.

Referring now to the drawings, wherein like reference numerals designate like or corresponding parts throughout the several views, there is shown in FIG. 1 an aircraft 11 equipped with a warning and search device 12, in accordance with the present invention, atop the aircraft and a similar device 12' below the aircraft. For operation of the system, a plurality of aircraft are so equipped. Since devices 12 and 12' are identical, only one will be described in detail. FIG. 2 is a closer view of the warning and search device 12 which comprises two radiation detectors 13, 14, and revolving carriage 15 supporting an optical mirror 16, all contained in a housing 17 having radiation transparent sides 18. Mounted atop the housing 17 is an ultra-violet source such as a mercury arc lamp 19.

Figure 3:
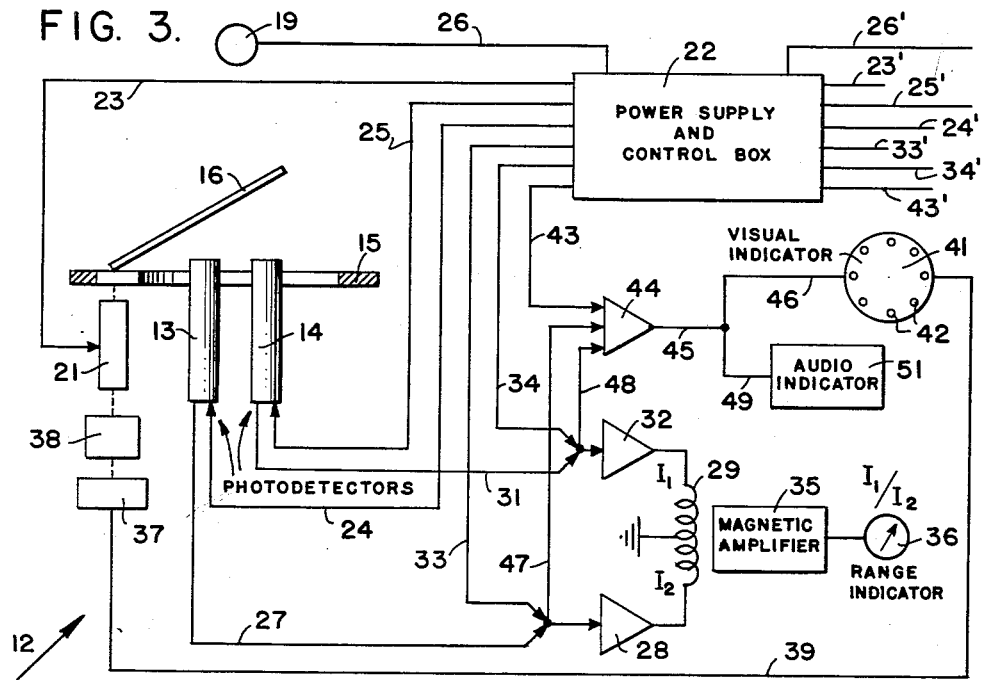
FIG. 3 is a schematic representation of a search device in accordance with the present invention employing two radiation detectors.

Turning now to FIG. 3, revolving carriage 15 is driven by a motor 21 which is connected to a power supply and control box 22 by a conductor 23. Radiation detectors 13 and 14 may be photodetectors or the like designed to be responsive in the 2000–2850 angstrom band in order to operate in a region in which solar background is completely absorbed by the ozone layer of the earth's atmosphere, thus utilizing the natural blackness of the sky in this spectral region to provide an interference-free solar-blind search system. The photodetectors 13 and 14 are connected to power supply 22 by conductors 24 and 25, respectively. Ultra-violet lamp 19, which may be a 100-watt mercury arc lamp, is connected to power supply and control box 22 through conductor 26 and is adapted to be pulsed at a low frequency, for example, five seconds on, five seconds off, by control means in the box and thus functions as a beacon.

Mirror 16 may take any desired form or dispostion for searching and during rotation thereof radiation received thereby is reflected to the photodetectors 13, 14, which are provided with filters so that one of the photodetectors is responsive to a band of the spectrum from about 2400 to about 2600 angstroms and the other photodetector is responsive to a band from about 2650 to 2850 angstroms. The marked difference in transmission between the 2500 and 2850 angstroms regions allows the monitoring of two lines from a standard 100-watt mercury arc (whose output would also be visually detectable) in a manner permitting estimation of range due to the exponentially different ratios of energy in the two regions at significant ranges. Accordingly, the output signal of photodetector 13 is fed by way of lead 27 through an amplifier 28 to one end of a coil 29 which is center-tapped to ground, and the output signal of photodetector 14 is fed through lead 31 and amplifier 32 to the other end of coil 29. Power is conveyed to amplifiers 28 and 32 from power supply 22 by leads 33 and 34, respectively. Operatively associated with coil 29 is a magnetic amplifier 35 which is responsive to the ratio of the currents $I_1$ and $I_2$ flowing in from the ends of coil 29 and actuates an indicator 36 which is suitably calibrated to indicate the range of the radiation received by the mirror 16. A changing indication on indicator 36 represents the closing rate of the aircraft emitting the radiation being detected.

Provision is also made for presenting bearing information of the detected radiation and giving visual and audio indication of the same. This is accomplished by rotating a commutator 37 or the like synchronously with carriage 15 through a gear box 38 connected to motor 21. The commutator 37 is indexed or correlated to the rotational position of mirror 16 and is connected by a cable or harness 39 to a visual indicator 41 comprising an array of lamps 42 indexed or correlated to the commutator. Power for lamps 42 comes from power supply 22 by way of lead 43, amplifier 44 and leads 45 and 46. The output signals from photodetectors 13 and 14, in addition to being fed to the ends of coil 29, are also fed to amplifier 44 by way of leads 47 and 48 for lighting up the lamp 42 which is indicative of the direction of the radiation being received. Thus, there is a visual warning of the radiation and its bearing is indicated. Simultaneously, the amplified signal from amplifier 44 is also fed by leads 45 and 49 to an audio indicator 51 such as a buzzer or a bell.

Warning and search device 12' may be an entity in itself having its own power supply and control box or, if desired, power supply and control box 22 may serve both systems 12 and 12'. In such case, leads 23', 24', 25', 26', 33', 34' and 43' serve the same purposes as their unprimed counterparts and are connected to corresponding components (not shown) in device 12'.

In operation, revolving carriage 15 of device 12 is rotated, thus rotating mirror 16 for searching the area to the sides and above the aircraft; the mirror of device 12' searching the area below. Simultaneously, the ultra-violet lamps of the systems are pulsed periodically for emitting radiation to warn other aircraft in the vicinity. It is understood, of course, that the mirrors and photodetectors of devices 12 and 12' are so related to the ultra-violet lamps thereof so as not to receive radiation therefrom but only from ultra-violet sources on nearby aircraft. Radiation picked up by the mirrors is reflected onto the photodetectors which, in response to particular portions of the ultra-violet band or "black" light region, generate output signals that are fed to the audio, visual and range indicating means, as previously described.

Figure 4:
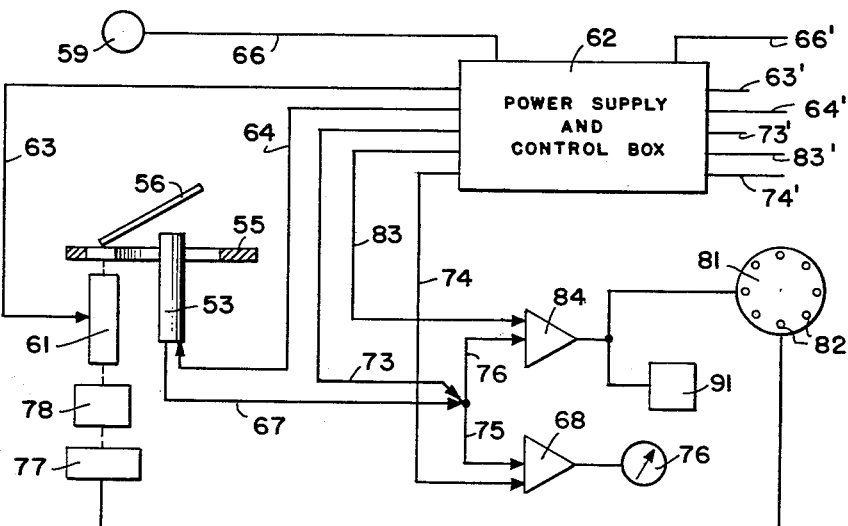
FIG. 4 is a schematic representation of a search device somewhat similar to FIG. 3 but employing only a single radiation detector.

In FIG. 4 there is shown a less sophisticated warning and search device 52 employing only one photodetector 53 which is responsive to radiation in the 2500–2850 angstroms band. Surrounding photodetector 53 is a revolving carriage 55 supporting an optical mirror 56 which may be of any desired form and disposed so as to reflect radiation received thereby onto the photodetector. Carriage 55 is rotated by a motor 61 which also drives a commutator 77 synchronously with the carriage through a gear box 78. Commutator 77 is connected, by way of a cable or harness 79, to a visual indicator 81 comprising an array of lamps 82, the commutator being correlated or indexed to the rotational position of the mirror 56 and to the lamp array for the purpose of indicating the direction or bearing of detector radiation as well as visually warning of its presence. The output signal generated by photodetector 53 is fed to amplifiers 68 and 84 by leads 67, 75 and 76. The portion of the signal amplified by amplifier 68 actuates an ammeter 76 which gives an indication of range based on the relative intensities of amplified signals. The other portion of the signal, after amplification by amplifier 84, is fed to the visual indicator 81 and to an audio indicator 91. Associated with device 52 is an ultra-violet beacon 59 and a power supply and control box 62 which is operatively connected to the components of the system by leads 63, 64, 66, 73, 74 and 83 as shown in FIG. 4. The power supply and control box 62 may be used to serve two devices by providing counterpart leads 63', 64', 66', 73', 74' and 84'. The operation of this system is substantially similar to that of system 12 with the exception that range indication is by intensity of signals from one photodetector rather than by the ratio of currents flowing in a coil as a result of different signals from two photodetectors.

Use may be made of the ultra-violet beacons alone to provide a measure of protection against collision. While aircraft equipped with the beacons alone will be unable to search the proximate area, the ultra-violet radiation from their beacons will be detected by aircraft equipped with warning and search systems in accordance with the present invention which latter aircraft will be apprised of the presence of the former and take action accordingly to avoid collision therewith.

Thus there has been provided an active warning and search system which is simple, lightweight and economical and which employs an interference-free solar-blind detection means in conjunction with an active source of radiation in the "black" region, which system takes advantage of the natural blackness of the sky in a certain spectral region because of absorption of solar background by the ozone layer of the earth's atmosphere. There has also been provided a search system which takes advantage of the marked difference in transmisssion between the 2500 and 2850 angstroms bands for monitoring of two lines from a standard 100-watt mercury arc lamp in a manner indicating approximate range due to the exponentially different ratios of energy in the two bands and is effective over moderate ranges of up to ten miles. The natural transmission of the atmosphere limits transmission from distant sources and thus prevents alarms from distant aircraft. Also, the choice of components making up the system will determine the limit of detectability to confine the same to moderate ranges.

Obviously many modifications and variations of the present invention are possible in the light of the above teachings. It is therefore to be understood that within the scope of the appended claims the invention may be practiced otherwise than as specifically described.

What is claimed is:

1. An apparatus for use on aircraft for signaling to other aircraft its presence and for detecting the presence of other aircraft, said apparatus comprising, in combination, a beacon, said beacon including an ultra-violet source for providing radiation in the "black" region of the spectrum, a search device for searching for beacons on other aircraft, said device including photodetection means and all-around scanning means, said photodetection means being responsive to a band of ultra-violet radiation in the "black" region of the spectrum and adapted to generate a signal indicative of radiation from a beacon on other aircraft said scanning means being disposed between said first-named beacon and said photodetection means and blocking radiation from the former to the latter, and means responsive to said signal adapted to indicate the approximate range of said beacon on said other aircraft.

2. The system of claim 1, wherein said band of ultra-violet radiation is in the spectral region from about 2500 to about 2850 angstroms.

3. A warning system, comprising; a search device, said device including detection means responsive to ultra-violet ration in the "black" region of the spectrum, scanning means rotatable about said detection means and adapted to receive and reflect radiation thereonto, a commutator rotatable synchronously with said scanning means and indexed thereto, indicating means connected and indexed to said commutator, and means connecting said detection means to said indicating means adapted to energize said indicating means in response to radiation reflected onto the detection means, said indexing of said scanning means, commutator and indicating means serving to indicate the bearing of said radiation reflected onto the detection means.

4. The system of claim 3, wherein said radiation is in the 2500–2850 angstroms spectral region.

5. A search system for use below the ozone layer of the earth's atmosphere, said system comprising, a device including a pair of photodetectors, one photodetector being sensitive to ultra-violet radiation in one of two adjacent bands in the "black" region of the spectrum, the other photodetector being sensitive to ultra-violet radiation in the other of said two adjacent bands in the "black" region of the spectrum, all-around scanning means for directing radiation from distant sources onto said photodetectors, and means connected to said photodetectors for monitoring ultra-violet radiation received from said two bands and indicating the approximate range of the radiation due to the exponentially different ratios of energy in the two bands; whereby an interference-free solar-blind search system is provided.

6. The search system of claim 5, wherein said one band is from about 2400 to about 2600 angstroms and said other band is from about 2650 to about 2850 angstroms.

7. An apparatus for use on aircraft for signaling to other aircraft its presence and for detecting the presence of other aircraft, said apparatus comprising, in combination, a beacon, said beacon including an ultra-violet source for providing radiation in the "black" region of the spectrum, first and second solar-blind photodetectors, said first photodetector being responsive to one of two adjacent bands in said "black" region of the spectrum, said second photodetector being responsive to the other of said two bands in said "black" region, rotatable scanning means for all-around search of-field viewing in a manner to reflect radiation received from other aircraft beacons onto said photodetectors each of which provide an output in response to the radiation received from a beacon on other aircraft, said scanning means being disposed between said first-named beacon and said photodetectors and blocking radiation from the former to the latter, and means connected to said photodetectors and responsive to the outputs thereof for monitoring the two bands from an aircraft beacon for estimation of range to said beacon on other aircraft based on the difference in transmission and exponentially different ratios of energy between said two bands.

8. The system of claim 7, wherein one of said bands is from about 2400 to about 2600 angstroms and the other band is from about 2650 to about 2850 angstroms.

9. The system of claim 7, wherein said last-named includes a coil center-tapped to ground and receiving the outputs of said photodetectors through its ends for flow of currents therethrough, and means responsive to the ratio of currents flowing through said coil for indicating the range to said last-named beacon.

10. The system of claim 7, said system further including a commutator rotatable synchronously with said scanning means and indexed thereto, indicating means connected and indexed to said commutator, and means connecting the outputs of said photodetectors to said indicating means for energizing said indicating means, said indexing of said scanning means, commutator and indicating means serving to indicate the bearing of said last-named beacon.

11. An aircraft warning apparatus comprising, in combination, photodetection means responsive to ultra-violet radiation in the "black" region of the spectrum, scanning means rotatable 360 degrees about said photodetection means, said scanning means including a tilted mirror adapted to receive and reflect radiation onto said photodetection means, a motor connected to said scanning means for rotating the same, a commutator connected to said motor for synchronous rotation with said scanning means and indexed thereto, indicating means connected and indexed to said commutator, and means connecting said photodetection means to said indicating means responsive to radiation reflected onto the photodetection means for energizing said indicating means for indicating the bearing of said radiation reflected onto the photodetection means.

12. An aircraft warning apparatus comprising, in combination, first and second solar-blind photodetectors, said first photodetector being responsive to a band of ultra-violet radiation in the "black" region of the spectrum, said second photodetector being responsive to a band of ultra-violet radiation in said "black" region adjacent said first band, scanning means rotatable for all-around search-of-field viewing, said scanning means including a revolving mirror tilted to reflect ultra-voilet radiation onto said photodetectors each of which provides an output in response to ultra-violet radiation received thereby, means connected to said photodetectors and responsive to the outputs thereof for monitoring said two bands of ultra-violet radiation for estimation of range to the radiation source based on the difference in transmission and exponentially different ratios of energy between said two bands, said last-named means including a coil center-tapped to ground and receiving the outputs of said photodetectors through its ends for flow of currents therethrough, a commutator rotatable synchronously with said scanning means and indexed thereto, indicating means connected and indexed to said commutator, and means connecting the outputs of said photodetectors to said indicating means for energizing the same and indicating the bearing of said radiation source.

References Cited in the file of this patent
UNITED STATES PATENTS

| | | |
|---|---|---|
| 1,963,185 | Wilson | June 19, 1934 |
| 2,237,193 | Mobsby | Apr. 1, 1941 |
| 2,489,223 | Herbold | Nov. 22, 1949 |